United States Patent [19]
Guillou et al.

[11] Patent Number: 5,442,701
[45] Date of Patent: Aug. 15, 1995

[54] PROCESS FOR THE BROADCASTING OF CONDITIONAL ACCESS PROGRAMS PERMITTING A PROGRESSIVE ACCESS TO SUCH PROGRAMS

[75] Inventors: Louis Guillou, Bourgbarre; Jean-Luc Giachetti, Rennes; Alain Gelly, Paris, all of France

[73] Assignees: France Telecom Establissement Autonome de Droit Public; Telediffusion de France S.A., both of Paris, France

[21] Appl. No.: 172,817

[22] Filed: Dec. 27, 1993

[30] Foreign Application Priority Data

Dec. 29, 1992 [FR] France ............... 92 15841

[51] Int. Cl.⁶ .................................. H04N 7/167
[52] U.S. Cl. ......................... 380/20; 380/10; 380/19
[58] Field of Search .............. 380/9, 10, 20, 19

[56] References Cited

U.S. PATENT DOCUMENTS 4,994,909  2/1991  Graves et al. ............... 358/86

*Primary Examiner*—David C. Cain
*Attorney, Agent, or Firm*—Oblon, Spivak, McClelland, Maier, & Neustadt

[57] ABSTRACT

A process for broadcasting conditional access programs which permits a progressive access. Scrambled program data is transmitted along with partial access checking messages and complete access checking messages such that subscribers having a partial access right may descramble portions of the scrambled data corresponding to information regarding only the identity of the conditional access programs, and subscribers having a complete access right may descramble the remainder of the scrambled data and view the conditional access programs. The conditional access programs may be television pictures, radio programs, or data broadcasts.

9 Claims, No Drawings

PROCESS FOR THE BROADCASTING OF CONDITIONAL ACCESS PROGRAMS PERMITTING A PROGRESSIVE ACCESS TO SUCH PROGRAMS

FIELD OF THE INVENTION

The present invention relates to a process for the broadcasting of conditional access programs permitting a progressive access, as well as to a process for the progressive access to such programs.

This invention is used in pay television, in the broadcasting of radio programs or sound or data, in the transmission and distribution of program elements intended to be integrated into the programs of program companies or cable distributors, within the framework of satellite reporting exchanges, e.g. in the news, sport or entertainments fields.

DESCRIPTION OF THE PRIOR ART

In conventional systems, access to programs is reserved for a certain population of receivers. A distinction can be made between various access rights (e.g. a program can be simultaneously accessible by subscription and by impulse buying), so that a receiver is authorized or not as a function of whether it does or does not have a certain access right.

This state of affairs does not enable a televiewer to decide, in the possession of all necessary information, what his interest would be in having access to a particular program. Conversely, for the organization offering programs, there are no direct means for inciting the televiewer to acquire new access rights except by indirectly supplying him by advertising or personalized mail with information relative to all available programs.

SUMMARY OF THE INVENTION

The present invention aims at obviating this disadvantage. To this end it proposes a process which gives a summary of certain programs. This summary is made possible by the use of an only partial access right, as opposed to the normal and total access right. Thus, in addition to authorized receivers who can have complete access to a program and unauthorized receivers who can receive nothing of such a program, according to the invention there are other receivers which could have a summary of the program, i.e. access to a discernible, but unusable form of the program.

This partial access right introduced by the invention will be referred to as "summary right" in the remainder of the description. Receivers having such a summary right will be referred to as "restricted receivers".

Thus, with the invention, there are no longer two, but instead generally three perception levels, namely the case where the picture is clear, the case where the picture is discernible, but not usable and the case where the picture is no longer discernible.

Users of restricted receivers could then choose to acquire an access right for a particular program with complete knowledge thereof. Therefore there is an incitement aspect.

For example, the process according to the invention can advantageously be applied to:
  incitement to subscribing to pay television,
  incitement to impulse consumption of pay television programs,
  incitement to purchase programs proposed by owners of rights, program companies or producers, within the framework of program exchanges or reports by satellite, e.g. in the news, sport or entertainments fields.

More specifically, the present invention relates to a process for broadcasting conditional access programs, in which in known manner:
  informations specific to various programs are scrambled,
  the thus scrambled informations are transmitted for each program,
  synchronized with each program transmission takes place of access checking messages specific to each of these programs and which are able to permit the descrambling and restoration of programs in receivers having corresponding access rights, said process being characterized in that there is also a transmission of partial access checking messages to at least some of these programs, said partial access checking messages being able to permit the descrambling and partial restoration of the corresponding programs for receivers having a partial access right.

Advantageously, to permit the performance of this process the information flow corresponding to each program is subdivided into a first or elementary flow corresponding to a program which, once restored in a receiver, will be discernible without being directly usable, and a second or complementary flow making it possible to complete the first flow, so as to permit the complete restoration of the program.

In this variant, the partial access checking messages will apply to the elementary flows.

The present invention also relates to a process for progressive access to programs, which have been transmitted in the manner described hereinbefore. In this process and in per se known manner:
  selection takes place of a program and an access checking message relative to said selected program is received, scrambled informations are received,
  with the aid of the message and an access right, the selected program informations are descrambled,
characterized in that:
  partial access checking messages are also received,
  by means of a partial access right, descrambling and partial restoration of the corresponding program take place,
  optionally, there is an acquisition of an access right in order to have complete access to said program.

The definition given hereinbefore of the invention with transmission of partial access checking messages and partial restoration of a program with the aid of a partial access right, is not limited to the sole case where the picture corresponding to the partial access right is a summary of a picture, i.e. a perceptible, but unusable picture. This definition also covers the case where the picture obtained has a quality below that of a picture which would use all the broadcast information, but which would still be usable. The different receivers utilizing the invention can therefore have different perception levels. Certain receivers could operate with a very high picture quality level and for this purpose would have to use all the transmitted information (if provided with the corresponding access right). However, other receivers would operate with a lower quality level, but which would still be acceptable and involving only part of the transmitted informations (if they are provided with a partial access right).

For example, a high definition television program HDMAC can be received by D2MAC receivers. In this situation, it would be desirable that D2MAC receivers would be less "indebted" than HDMAC receivers. Such a result is possible with the invention with the following perception levels:
completely scrambled program,
D2MAC perception,
HDMAC perception.

It is naturally also possible to introduce in the above hierarchy, a restricted perception level leading to perceptible, but unusable pictures, in order to incite the televiewer to acquire access rights corresponding to a higher perception level in the hierarchy.

However, in the following description and for simplification purposes, there will be a limitation to the case where introduction occurs of a partial access right corresponding to discernible, but unusable pictures.

DETAILED DESCRIPTION OF THE PREFERRED EMBODIMENTS

The process according to the invention can be implemented in advantageous manner by organizing a video component in at least two flows, when it is a question of transmitting television programs. A first or elementary flow makes it possible to obtain a discernible picture, which is not directly usable. A second or complementary flow makes it possible to obtain the remainder of the video component.

At least three methods make it possible to bring about such a subdivision of the video component. This subdivision can be quality, space or time based.

a) In a quality subdivision, the elementary flow transports all the informations giving a very mediocre quality picture. The complementary flow transports the informations giving the picture its full quality. Quality subdivision can also be looked upon as an extension of hierarchic coding, which makes it possible to obtain different perception levels with the same signal. With the presently indexed quality levels (VHS equivalent quality, SECAM equivalent quality, D2MAC equivalent quality and HD equivalent quality) is added a very mediocre quality level supplying a discernible, but unusable picture.

b) In a space subdivision, the picture is e.g. subdivided horizontally into a few bands of a few consecutive lines. One part of the bands (e.g. half) constitutes the elementary flow and the other part (the other half), constitutes the complementary flow.

c) In a time subdivision, the time is broken down into periods of a certain duration (e.g. about ten seconds). Part of the period (2 to 3 seconds) constitutes the elementary flow, whereas the remainder of the period constitutes the complementary flow.

In this case, it is the very principle of time subdivision at a sufficiently high frequency which makes it possible to obtain a discernible, but not directly usable program.

No matter which variant is chosen, the process according to the invention consists firstly of separately scrambling each of the flows, e.g. with sequences of different check words and then allocating access criteria to each sequence of check words, so that the following conditions are satisfied:
an access right permits access to two sequences of check words,
a partial right or summary permits access only to the sequence of check words permitting the descrambling of the elementary flow.

Thus, the holder of a summary right can discern the presence of a program and can even evaluate its nature and interest. If he wishes, he can then acquire an access right so as to give access to the complete program.

In the preceding variant, the two flows are scrambled by two series of different words. In another variant, it is possible to use a same series of check words for scrambling the two flows. Thus, knowing that the check words have a limited life (approximately 10 seconds in D2MAC Eurocrypt), it is possible to define three populations of receivers, namely receivers not having the check word do not see the program, receivers having the check word in uncoded form throughout its validity period have access to the program and receivers having access to check words during the final instance of their validity period have access to the summary.

This latter case is possible by adding to the access control message system a few seconds prior to the end of the life of each check word, a new criterion, which is constituted by the summary criterion, authorizing access to the check word finishing its life. This new criterion will be used by restricted receivers. Obviously, during the life of a check word, the following check word cryptogram must not be broadcast.

The following diagrams illustrate this variant in the case where each check word has a life of 10 sec. In this case the abbreviation AC stands for the access criterion, AP for the summary criterion, CWe (or CW'e) for the cryptogram of an even check word and CWo (or CW'o) the cryptogram for an uneven check word.

The messages transmitted are then as follows, during the different periods:
first period: AC (CWo, CWe) during 7 seconds,
then AC, AP (CWe) for 3 seconds,
second period AC, (CWo, CW'e) for 7 seconds,
then AC, AP (CWo) for 3 seconds,
third period AC, (CW'o, CW'e) for 7 seconds,
then AC, AP, (CW'e) for 3 seconds.

With such a diagram every ten seconds, for three seconds, the receivers having a summary right are able to reconstitute the program.

If several programs are carried on the same network, all the programs can use the same summary criterion and the same check word for authorizing descrambling of the elementary flow. Thus, if the user has this check word, he will rapidly acquire access to the elementary flows of all the programs of the network without having to acquire or calculate a new right and a new check word for each program. This implementation makes it possible to eliminate the switching time due to the conditional access on passing from one program to another within a group of programs, whose scrambling is synchronized at the transmission point.

It must be stressed that the invention is particularly advantageous when the transmitted signals are of a digital nature (as opposed to analog signals). It is pointed out in this connection that the scrambling procedures give rise to two contradictory constraints:
on the one hand, the comfort of the user, which must not be impaired by the scrambling, so that the scrambling methods must not increase the errors or distortions introduced by faults due to transmission, this applying between scrambling operations centralized at the transmission point and descrambling operations performed in each decoder;
on the other hand piracy, which must be made difficult, so that the signal must be well protected.

In practice, scrambling must be adapted to the encoding of each component of the service: pictures, sound and data. Thus, the possible processing operations on analog elements of the signal remain very limited, because when the operations become complicated, deteriorations due to the successive scrambling and descrambling operations rapidly become unacceptable for users. In other words, the hitherto most widely used standards for the transmission of sound and television pictures (SECAM, PAL and NTSC) are not economically compatible with the processing operations which would make the signal very difficult to pirate. The correlation between the scrambled signal and the signal in uncoded form therefore remains very important. For example, the pictures due to the DISCRET I process presently used by the CANAL PLUS chain remain very recognizable. These pictures can be easily reconstituted by pirates. In order to limit fraud, it is necessary to have sophisticated scrambling methods, which are not very compatible with the objective of obtaining an inexpensive decoder.

The situation is radically modified for digital elements of the signal. There can then be considerable protection, even with a summary scrambling operation consisting of the bitwise combination by an exclusive-OR logic gate of the sequences of bits representing digitized signal samples with sequences of bits produced by a pseudorandom generator. For example, the scrambled pictures received on a 34 Mbit digital television decoder allow nothing to appear. The correlation between the scrambled signal and a signal in uncoded form becomes very difficult. Thus, there can be no incitement. By introducing access to a summary, the process according to the invention makes it possible to obviate this disadvantage.

We claim:

1. A method of broadcasting conditional access programs, comprising the steps of:
    (a) scrambling data representing a content of at least conditional access program; and
    (b) transmitting such scrambled data along with partial access checking messages and complete access checking messages to subscribers, said partial access checking messages permitting said subscribers to descramble portions of said scrambled data corresponding to information regarding only the identity of said at least one conditional access program, and said complete access checking messages permitting authorized subscribers to descramble a remainder of said scrambled data and view said at least one conditional access program.

2. The method according to claim 1, wherein said at least one conditional access program is a television program, and a video component of television signals is scrambled in step (a) and transmitted in step (b).

3. The method according to claim 2, wherein each television picture to be scrambled is horizontally subdivided into bands of a plurality of consecutive lines, and said scrambled data is derived from a first part of said bands while said partial access checking messages and said complete access checking messages are derived from a second part of said bands.

4. The method according to claim 2, wherein said television signals are subdivided into time periods, and said scrambled data is derived from information present in one part of each time period while said partial access checking messages and said complete access checking messages are derived from information present in a remainder of each of said time periods.

5. The method according to claim 1, wherein said partial access checking messages and said complete access checking messages are separately scrambled using first and second check word sequences, respectively, such that subscribers having a complete access right have access to both said first and second check word sequences, while subscribers having a partial access right only have access to said first check word sequence.

6. The method according to claim 1, wherein said partial access checking messages and said complete access checking messages are scrambled with a single check word sequence having a finite duration, such that subscribers having a complete access right have access to said check word sequence throughout its duration while subscribers having only a partial access right only have access to said check word sequence during a limited portion of its duration.

7. The method according to claim 1, wherein said at least one conditional access program is a television program, and an audio component of television signals is scrambled in step (a) and transmitted in step (b).

8. A method according to claim 1, wherein said at Least one conditional access program is a radio program.

9. A method according to claim 1, wherein said at least one conditional access program is a data broadcasting program.

* * * * *